United States Patent Office 2,861,977
Patented Nov. 25, 1958

2,861,977

PREPARATION OF INTERCONDENSATION PRODUCT OF MONOHYDRIC PHENOL-FURFURAL RESIN AND FORMALDEHYDE, AND UTILIZATION THEREOF IN THE PRODUCTION OF PLYWOOD

Gene F. Baxter and Donald V. Redfern, Seattle, Wash., assignors to American-Marietta Company, Adhesive, Resin and Chemical Division, Seattle, Wash., a corporation of Illinois No Drawing. Application January 26, 1954
Serial No. 406,346

18 Claims. (Cl. 260—56)

The present invention relates to the preparation of an intercondensation product of a monohydric phenol-furfural resin as, for example, a phenol-furfural resin; and formaldehyde, and its utilization as a plywood adhesive.

In preparing the monohydric phenol-furfural resin, the molar ratio of the furfural to the phenol may vary between about 0.10 and 0.5 mol, and it is not necessary to distill off the excess phenol prior to intercondensing the resin with formaldehyde.

The upper limit of the furfural-monohydric phenol ratio as, for example, furfural-phenol ratio, is determined primarily by the following two factors; one, as the furfural-monohydric phenol ratio is raised, the fully reacted dehydrated monohydric phenol-furfural resin becomes more viscous and this would necessitate a change in the equipment now in use for the manufacture of plywood resin; two, the point can be reached at which it is difficult or impossible to obtain complete reaction of the furfural, and in carrying out the present invention, it is desirable to have a substantial excess of phenol. In carrying out the invention, the furfural-monohydric phenol molar ratio may comprise 0.5, or 0.45, or 0.35, or 0.25 mol of furfural per mol of monohydric phenol as, for example, phenol per se, $C_6H_5OH$.

While it is preferred to use a monohydric phenol resin as, for example, a phenol-furfural resin prepared from phenol per se and furfural as hereinafter set forth, it is within the province of the present invention to use any of the prior art substantially permanently fusible furfural-monohydric phenol resins, including the condensation product of furfural and phenol per se, metacresol and metaxylenol.

After the furfural-monohydric phenol resin is made, it is intercondensed with an aldehyde as, for example, formaldehyde.

In preparing the intercondensation product with the aldehyde as, for example, formaldehyde, the formaldehyde to monohydric phenol ratio as, for example, formaldehyde to phenol ($C_6H_5OH$) ratio may broadly vary between the limits of 1.5 to 2.9 mols of formaldehyde per mol of monohydric phenol. More limitedly, the aldehyde to phenol ratio may vary between the limits of about 1.8 and 2.5 mols of formaldehyde per mol of the monohydric phenol as, for example, phenol per se $C_6H_5OH$, metacresol, and metaxylenol.

In preparing the intercondensed resin, the broad ratio of the total aldehyde which includes the furfural and the formaldehyde to the monohydric phenol as, for example, phenol $C_6H_5OH$, metacresol, and metaxylenol, may vary broadly between the limits of about 1.6 and about 3 mols of total aldehyde to one mol of phenol, and more narrowly, the ratio may vary between the limits of 1.9 and 2.9 mols of total aldehyde to one mol of the monohydric phenol.

One of the features of the present invention resides in preventing the retardation in the rate of cure of a monohydric phenol-forfural-formaldehyde condensation product and conferring thereon the same rate of cure as that possessed by a straight phenol-formaldehyde condensation product produced under substantially identical conditions, the formaldehyde-phenol molar ratio being the same in both resins. This is accomplished by forming a monohydric phenol-furfural aldehyde condensation product, the total aldehyde-phenol molar ratio of the phenol-furfural-formaldehyde condensation product being greater than that of the said monohydric phenol-formaldehyde condensation product, said phenol-furfural-formaldehyde condensation product being produced by forming an aqueous mixture of a monohydric phenol having a hydroxyl group attached to a ring carbon, furfural, and an inorganic alkaline catalyst accelerating the formation of the resin reaction product on heating, there being present between about 0.1 and about 0.5 mol of furfural for each mol of monohydric phenol, such as phenol per se $C_6H_5OH$, heat-reacting said mass and producing a solution of a monohydric-phenol-furfural resin in the monohydric phenol, as for example, phenol or the equivalents thereof herein set forth, the phenol being adapted to combine with subsequently added formaldehyde. The resultant solution is heat-reacted and intercondensed with additional formaldehyde in the presence of an alkali metal hydroxide, preferably sodium hydroxide, or a mixture of an alkali metal hydroxide, preferably sodium hydroxide, and an alkali metal carbonate, preferably sodium carbonate, $Na_2CO_3$, until the final intercondensed solution having a solids content between about 30% and about 55% has a viscosity between the limits of about 130 and about 10,000 centipoises, there being present between 1.5 and 2.9 mols of formaldehyde for each mol of said phenol, the total alkali material present during the production of the said phenol furfural formaldehyde intercondensed resin being equivalent to between about 0.1 and about 1.0 mol of sodium hydroxide per mol of phenol.

It has been discovered that heat-reacting and intercondensing said solution with formaldehyde in the presence of a mixture of sodium hydroxide and sodium carbonate accelerates the rate of intercondensing reaction and shortens the time of intercondensation.

The following is an example illustrating the present invention:

Example I

A furfural-phenol resin, herein identified as resin A, is prepared by mixing the following ingredients in the proportions specified and heating said ingredients:

77.47 parts by weight of 90% phenol
2.79 parts by weight of 50% NaOH
17.76 parts by weight of furfural
1.98 parts by weight of water 100.00 parts by weight total The phenol and sodium hydroxide were placed in a jacketed, enclosed reaction kettle fitted with an ordinary condenser and a reflux condenser, either of which could be closed off. The resulting solution was agitated and brought to a state of boiling with steam heat in about a period of 20 minutes. The heating of the resulting solution was continued for about two hours and a distillate consisting of water and phenol was drawn off so that the reaction solution of phenol and sodium hydroxide was boiling at about 127° C. at the end of this period of time. Thereafter, the furfural in the amount set forth was added and the batch was refluxed at a temperature between 120° and 125° C. After a period of time of about 30 minutes it was necessary to withdraw the condensate occasionally to keep the reaction temperature at above 120° C. Cooking was continued thereafter at a temperature between 120° and 125° C. for a further period of 85 minutes, at which time the reaction between the phenol and the furfural was complete. The resin was then cooled to room temperature, that is, about 20° C. and the distillate and formula water were added and blended in. The final product was a dark brown homogeneous liquid with a viscosity of 90 centipoises, a specific gravity of 1.15, and a pH of 8.7.

Resin A was used in the preparation of resin B, which is an intercondensation product of resin A and formaldehyde. Resin A was mixed with formaldehyde, sodium hydroxide, in the following proportions:

30.33 parts by weight of resin A
45.55 parts by weight of 37% uninhibited formaldehyde
11.49 parts by weight of water
12.63 parts by weight of 50% NaOH 100.00 parts by weight total Referring to the above, the term "uninhibited formaldehyde" defines formalin, that is, aqueous HCHO solution containing less than 2% of methanol. Inhibited formaldehyde is a grade of formaldehyde which contains about 7% methanol which confers upon the formaldehyde an increased stability during storage. Either grade of formaldehyde may be used in carrying out the present invention. If inhibited HCHO is used in preparing resin B, then a higher temperature is required so as to prevent the cooking time from being too long.

In preparing resin B, resin A was placed in the reaction kettle and about ⅛ of the NaOH used in the preparation of resin B was added to thereby prevent precipitation of the resin. Thereafter, the formaldehyde and water were added, and the temperature of the charge was adjusted to about 20° C. The remainder of the NaOH was then added slowly over a period of 15 minutes until a total of 12.63 parts of 50% sodium hydroxide had been added. The addition of the sodium hydroxide in increments over a period of time promoted and provided a gradual temperature rise since the dilution of the sodium hydroxide and the exothermic reaction initiated by the sodium hydroxide produces a very considerable heating effect. From the start of the addition of the major portion of the sodium hydroxide, the temperature was controlled to rise uniformly to about 90° C. in 45 minutes by passing cold water and steam through the kettle jacket at appropriate times. At the start of the cook, small samples of the mixture showed cloudiness upon dilution due to the water insolubility of resin A, but by the time the temperature had increased to about 50° C., small samples of the mixture were miscible with water in all proportions.

After the mixture of resin A, formaldehyde, water and sodium hydroxide was made and heated as above set forth, the resulting mixture or reaction product was held at a temperature of 90° C. for about 70 minutes, after which the resin had a viscosity of 129 centipoises measured at 25° C. The temperature of the reaction product was then lowered to 80° C. during a period of 15 minutes, and held at 80° C. for a further period of 28 minutes before cooling was again applied to bring the resin to room temperature, that is, 20° C. The final product was a brown liquid with a viscosity of 174 centipoises at 25° C., a specific gravity of 1.198, and a non-volatile content of 42.8 determined by heating a one-gram sample at 125° C. for 1¾ hours.

The viscosity of the final intercondensed product is fairly important. This viscosity is the reflection of the degree of advancement or the molecular size of the resin. It is desirable that the resin be advanced so that it progresses far toward the point where the resin becomes insoluble in its mother solution but still does not attain insolubility, that is, it remains in solution.

If the finally intercondensed resin, herein identified as resin B, when utilized for the gluing of plywood panels, requires too long a pressing time or tends to show excessive flow during pressing, then the resin may be cooked to a higher final viscosity. Resin B at a final viscosity of about 174 centipoises has about the proper degree of advancement for average gluing conditions. Broadly, it may be stated that the intercondensed resin may have a viscosity between the limits of about 130 and 8000 or 10,000 centipoises. For resins containing a total resin content of up to about 45% solids the viscosity may be anywhere from 100 or 130 centipoises to about 2300 or 2500 centipoises, or perhaps a little higher. However, when the total solids of the resin approaches 50% solids or 55% solids, the viscosity thereof may be as high as 8000 or 10,000 centipoises. For the intercondensed resin B, which contains 36.5% of resin solids, the viscosity may be between 100 or 130 centipoises, and 2300 or 2500 centipoises. Broadly, the total percentage of solids present in the intercondensed resin should be between the limits of about 30% and about 55%. It may be pointed out that the viscosity of the finally condensed product affects the handling and spreading characteristics of the product. However, this is not too critical. The viscosity of the intercondensed resins herein set forth may broadly vary between the limits set forth without causing undue difficulty in the handling and spreading of the resin. The viscosity characteristics of the resin may be adjusted to some extent by using variations in the mixed formulation.

A plywood adhesive was prepared with resin B in the following manner:

500 parts by weight of resin B liquid having a viscosity of 174 centipoises at 25° C. and containing 36.5% of resin solids were mixed with 100 parts of an extender. This extender can be any of the extenders commonly used in the plywood adhesive art. A suitable extender may consist of 40% finely ground Furafil M, an agricultural residue filler material produced by the Quaker Oats Co., 30% Glufil which is walnut shell flour, 20% Silvacon 509 which is ground Douglas fir bark fiber produced by the Weyerhaeuser Timber Co. of Tacoma, Washington, and 10% superfine wood flour produced by Northwest Processing Co. The resin and extender were mixed for 5 minutes on a Hobart mixer, and then 100 parts by weight of water were added and the mixing continued for another 5 minutes. The finished mix, which is hereinafter referred to as adhesive I, was a dark brown, thin, homogeneous mixture having a viscosity of 10 on a McMichael viscosimeter measured at 25° C. with a No. 30 wire using 20 R. P. M. rotation and 5 cm. spindle immersion.

The following table sets forth the tests made on plywood united with the plywood adhesive of the present invention which is designated adhesive I, a plywood adhesive produced in accordance with the procedure of Redfern Reissue Patent No. 23,347 which is identified as adhesive II, and a plywood adhesive prepared in accordance with the disclosure of U. S. Patent No. 2,462,253 to Booty hereinafter referred to as adhesive III. In the tests 3-ply 7/16" Douglas fir plywood panels were prepared with each glue at its recommended spread, i. e., 60, 60, and 50 lbs./1000 square feet of double glue line for adhesives I, II and III, respectively. Matched veneers were used for corresponding panels so that the variations inherent in wood structure and composition were eliminated as much as possible. The panels were pressed at 285° F. and 175 pounds per square inch. Each figure shown in the following table is an average for two panels. These panels were tested according to the Douglas Fir Plywood Association Commercial Standard CS 45–48 Boiling Test, except that ten specimens were taken from each panel instead of only five.

The test results are as follows:

| Test No. | Assembly Time, minutes | Pressing Time, minutes | Special Conditions | Adhesive I, lbs./sq. in. | Percent Wood Failure |
|---|---|---|---|---|---|
| 1 | 3 | 4 | None | 211.5 | 32 |
| 2 | 20 | 3 | do | 191.5 | 84 |
| 3 | 20 | 3½ | do | 164.5 | 99 |
| 4 | 20 | 4 | do | 224.5 | 77.5 |
| 5 | 30 | 4 | Stock @ 150° F. | 163 | 98 |
| 6 | 60 | 4 | do | 158 | 71 |
| 7 | 180 | 4 | do | 131.5 | 47 |
| Average | | | | 177.8 | 72.6 |

| Test No. | Assembly Time, minutes | Pressing Time, minutes | Special Conditions | Adhesive II, lbs./sq. in. | Percent Wood Failure |
|---|---|---|---|---|---|
| 1 | 3 | 4 | none | 151 | 96.5 |
| 2 | 20 | 3 | do | 244 | 91 |
| 3 | 20 | 3½ | do | 164 | 99 |
| 4 | 20 | 4 | do | 143.5 | 97.5 |
| 5 | 30 | 4 | Stock @ 150° F. | 151 | 99 |
| 6 | 60 | 4 | do | 133.5 | 48.5 |
| 7 | 180 | 4 | do | 26.5 | 0 |
| Average | | | | 144.8 | 75.9 |

| Test No. | Assembly Time, minutes | Pressing Time, minutes | Special Conditions | Adhesive III, lbs./sq. in. | Precent Wood Failure |
|---|---|---|---|---|---|
| 1 | 3 | 4 | none | 186 | 4 |
| 2 | 20 | 3 | do | 150 | 13 |
| 3 | 20 | 3½ | do | 159.5 | 54.5 |
| 4 | 20 | 4 | do | 184 | 66 |
| 5 | 30 | 4 | Stock @ 150° F. | 217 | 93 |
| 6 | 60 | 4 | do | 210.5 | 92 |
| 7 | 180 | 4 | do | 208 | 80 |
| Average | | | | 187.9 | 57.5 |

The above table shows that adhesive I is fully equivalent in performance to the two standard adhesives, and lies between the two with respect to flow and cure properties. All three possess different characteristics in these respects and each would perform well under certain mill conditions and requirements.

It is desired to point out that in preparing the monohydric phenol-furfural resin, the phenol and the catalyst are heated together and water is distilled off until the boiling point is about 125° C. This distillation may be eliminated if pure phenol and caustic soda are used, but if 90% phenol and 50% sodium hydroxide are used, it is necessary to distill off the water. Phenol and sodium hydroxide of the strengths indicated are used because the products are easy to weigh and handle. No reaction takes place during the operation except that, of course, the phenol is neutralized immediately upon being mixed with the sodium hydroxide, and some phenate ions are present. The distillate consists of water and a small amount of phenol. The purpose of the distillation is to remove the water. The removal of the phenol is incidental. It is desirable that most of the water be removed so that when the furfural is added and water of condensation is formed, the boiling point of the mixture will not immediately drop below the desired reaction temperature. If this is allowed to happen, then it will be necessary to draw off more condensate at once and some furfural would distill off before it had a chance to combine.

It is desired to point out that the furfural is added to preheated phenol rather than being heated together with the phenol in order to prevent undesirable side reactions. After heating for about two hours within a temperature range of 120° to 125° C. the viscosity of the phenol furfural condensation product has reached a fairly uniform value as, for example, about 4 poises when the furfural is added in the ratio of 0.25 mol of furfural per mol of phenol. The viscosity does not increase further unless the distillate is withdrawn. This shows that the reaction is complete. The monohydric phenol-furfural resin condensation product is cooled and all the distillate is returned so that there is no loss of phenol. The formula water is also added at this point. The only reason the water as such is included in the formula is to allow an adjustment in case the phenol used is not exactly 90% concentration, and the sodium hydroxide used is not exactly 50%. In this manner, the final composition of successive batches is held constant. The finished resin A is a solution of a phenol-furfural resin in free phenol with some water present, and it is used in this form as an intermediate for the preparation of the intercondensed resin, that is, the final intercondensed resin which is a phenol-furfural-formaldehyde resin.

Referring to the preparation of resin A, the amount of alkali metal hydroxide catalyst used may vary from 0.01 to 0.15 mol per mol of monohydric phenol, and most desirably the amount of said catalyst is about 0.05 mol per mol of phenol.

The ratio of the alkaline material to the monohydric phenol used in producing the final intercondensed product, said alkaline material being expressed as sodium hydroxide, is between the limits of 0.14 mol and 1.0 mol per mol of the monohydric phenol. This includes both the alkaline material added to produce the base resin A and the alkaline material, such as the alkali metal hydroxide, added during the intercondensation of the monohydric phenol-furfural product with formaldehyde.

A furfural-phenol resin, herein identified as resin C, was prepared by mixing the following ingredients in the proportions specified and heating said ingredients:

*Example II*

72.2 parts by weight 90% phenol
2.6 parts by weight 50% NaOH
23.3 parts by weight furfural
1.9 parts by weight water 100.0 parts by weight total The technique of preparation was the same as for resin A of Example I except that 3 hours' heating from the time of the furfural addition was required to complete the reaction. The viscosity at the end of this 3-hour heating period was 6340 centipoises measured at 25° C. The final viscosity after the resin was cooled and the distillate and formula water were added was 269 centipoises; the specific gravity was 1.17, and the pH was 9.1. The nonvolatile content determined by heating a one-gram sample at 125° C. for 1¾ hours was 61.2%.

This resin has a furfural/phenol molar ratio of 0.35 and an NaOH/phenol molar ratio of 0.05.

Resin C was used in the preparation of the following resin D which is an intercondensation product of resin C and formaldehyde:

3.00 parts by weight water
0.26 parts by weight methyl cellulose
48.07 parts by weight 37% uninhibited formaldehyde (HCHO)
46.26 parts by weight resin C
1.50 parts by weight 50% NaOH (1st increment)
0.91 part by weight 50% NaOH (2nd increment)

100.00

The methyl cellulose used was a grade which has a viscosity of 3500 centipoises in 2% aqueous solution. The water was heated to boiling and poured over the methyl cellulose. This mixture was stirred and quickly poured into the formaldehyde and the formaldehyde-methyl cellulose-water mixture then stirred until a uniform mixture was obtained. This technique is used to dissolve the methyl cellulose without lumping. Methyl cellulose has a very low degree of solubility in hot water, and the hot water therefore wets it uniformly.

The resin C and the methyl cellulose-formaldehyde solution were stirred together in the reaction kettle and cooled to 23° C. The first sodium hydroxide increment was then added and the temperature of the mixture was controlled to rise uniformly to 50° C. in the next 65 minutes and then to 80° C. for 35 minutes and at the end of this time the viscosity was 1070 centipoises measured at 25° C. Cooling was then applied to reduce the temperature to 60° C. during the next 10 minutes. The second NaOH increment was then added, vacuum was applied until boiling took place, and 3.00 parts by weight of water was removed and discarded. The resin was then cooled to 25° C. and had a final viscosity of 3620 centipoises; a non-volatile content or total solids, including resin solids of 52.8% determined by heating a one-gram sample at 125° C. for 1¾ hours, and a specific gravity of 1.19.

The formaldehyde/phenol molar ratio is 1.85, the furfural/phenol molar ratio is 0.35, the total aldehyde/phenol molar ratio is 2.20, and the NaOH/phenol molar ratio is 0.14. The final product contains 1.86% NaOH and 0.26% methyl cellulose which are calculated values.

A plywood adhesive was prepared with resin D in the following manner:

225 grams water at 185° F.
50 grams ground Douglas fir bark extender. Mix for 2 minutes.
37.5 grams sodium carbonate. Mix for 2 minutes.
105 grams 50% NaOH. Mix for 1 minute.
100 grams ground Douglas fir bark extender. Mix for 20 minutes in jacketed, covered mixer with boiling water in jacket. Cool to 140° F. Add 41 grams of water to compensate for loss during cooking of the extender.
4.5 grams diesel oil. Mix for 5 minutes.
750 grams resin D. Mix until smooth for a period of about 10 minutes.

The final mixture was a dark brown, viscous mass with a viscosity of 78 on a McMichael viscosimeter measured at 25° C. using a No. 26 wire, 20 R. P. M. rotation, and 5 cm. spindle immersion.

In utilizing said adhesive, 3-ply Douglas fir plywood panels were prepared using a spread of about 60 lbs. per 1000 sq. ft. of plywood. The plywood panels were then heated at a platen temperature of 285° F. under a pressure of about 175 lbs. per sq. inch and for a pressing time of 4 minutes. The panels were tested according to the Douglas Fir Plywood Association Commercial Standard CS 45–48 Boiling Test. Each figure is an average for 2 panels:

| Test No. | Assembly Time, Minutes | Percent Wood Failure |
|---|---|---|
| 1 | 10 | 85 |
| 2 | 20 | 91.5 |
| 3 | 30 | 93.5 |
| Avg | | 90 |

These were very good bonds of the high-flow type.

*Example III*

A phenol-formaldehyde resin, herein identified as resin E, was prepared by mixing the following ingredients in the proportions specified and heating said ingredients:

25.40 parts by weight 90.00% phenol
40.60 parts by weight 37.00% formaldehyde (uninhibited)
18.90 parts by weight water
8.66 parts by weight 50.00% NaOH (first increment)
2.04 parts by weight 50.00% NaOH (second increment)
4.40 parts by weight 50.00% NaOH (third increment)

100.00 parts by weight total

The phenol, formaldehyde, water and first increment of NaOH were placed in the reaction kettle, agitated and heated to reflux temperature, about 100–103° C., in 40 minutes. The mixture was refluxed for 25 minutes, then cooled to 90° C. in 30 minutes. Two minutes thereafter, at a temperature of 89° C., the second increment of NaOH was added and cooling of the so treated mass was continued. After a period of 10 minutes the temperature reached 87° C. and then the third increment of NaOH was added.

The resin was held at a temperature of about 87° C. for 10 minutes and then cooled rapidly to room temperature. The final product was a red liquid with a viscosity of 212 centipoises at 25° C.; a specific gravity of 1.191, and a total solids content of 40.8% determined by heating a one-gram sample for 1¾ hours at 125° C.

Resin C, which is a condensation product of phenol and furfural, was used in the preparation of resin F which is an intercondensation product of resin C and formaldehyde, resin F being prepared by mixing the following ingredients and processing as specified:

31.85 parts by weight resin C
30.43 parts by weight 37.12% formaldehyde (uninhibited)
26.36 parts by weight water
7.23 parts by weight 48.96% NaOH (first increment)
1.80 parts by weight 48.96% NaOH (second increment)
2.33 parts by weight 48.96% NaOH (third increment)

100.00 parts by weight total

Resin C, formaldehyde, water and the first increment of NaOH were mixed and heated to refluxing, that is, between about 100–103° C. for about 50 minutes. During the temperature rise, small samples of the mixture showed cloudiness upon dilution with water due to the water-insolubility of resin C, but by the time reflux temperature was reached, a small sample was miscible with water in all proportions. The charge was held at refluxing temperature for 23 minutes and then cooled to about 70° C. in 12 minutes, and maintained at about 70 to 75° C. for 47 minutes. The viscosity at the end of this period of time measured at 25° C. was about 6300 centipoises. The second increment of NaOH was added and further cooling applied. About 4 minutes later, the temperature reached 60° C. and the third increment of NaOH was added. The resin was then cooled to room temperature, that is between 20 and 25° C., and appeared as a thin brown liquid with a viscosity of 165 centipoises measured at 25° C.; a specific gravity of 1.183; and a total solids content of 40.3% determined by heating a one-gram sample for 1¾ hours at 125° C.

Resin G was prepared in the same manner as resin F by intercondensing previously prepared resin C with formaldehyde and adding sodium hydroxide in increments. However, the formaldehyde-phenol molar ratio was higher. In preparing resin G 36.58 parts by weight of 37.12% formaldehyde was used instead of 30.43 parts of formaldehyde, and the amount of water was reduced from 26.36 parts to 25.20 parts to keep the total solids content the same. As with resin F, the initial charge was brought to refluxing in 50 minutes. In this example, the resin attained the stage of complete water-miscibility about 5 minutes before reflux temperature was reached. It was held at refluxing for 12 minutes, cooled to about 80° C. in the next 6 minutes, maintained at about 80–85° C. for 31 minutes, and then cooled to 74° C. in the next 7 minutes. At this time, the viscosity measured at 25° C. had increased to 4630 centipoises. The second increment of NaOH was added and cooling was continued. In about 4 minutes the temperature reached 60° C. and the third increment of NaOH was added. The resin was cooled to room temperature and appeared as a thin brown liquid with a viscosity of 140 centipoises at 25° C.; a specific gravity of 1.183; and a total solids content of 40.4% determined by heating a one-gram sample for 1¾ hours at 125° C.

Resins E, F, and G are about equal in all respects except their aldehyde contents. They have about equal total solids, were produced under similar cooking procedures, and contain 0.78 mol of NaOH per mol of phenol which was divided into portions of 0.45, 0.10, and 0.23 mol. In the case of resins F and G, the 0.45 mol portion is made up of NaOH from the base resin plus the first NaOH increment shown in the formula. Resin E has 2.06 mols of formaldehyde per mol of phenol and no furfural. Resin F has 2.06 mols of total aldehyde per mol of phenol, of which 1.71 mols are formaldehyde and 0.35 mol are furfural. Resin G has 2.41 mols of total aldehyde per mol of phenol, of which 2.06 mols are formaldehyde and 0.35 mol are furfural.

The relative cure rates of resins E, F, and G were determined by the following test. An electrically heated, thermostatically-controlled hot plate was set at a temperature of 115° C. Then 0.1 ml. of resin was placed on the hot plate, spread over an area of about one square inch with a spatula, and stroked until no longer tacky. The time between the placement of the sample on the hot plate and its loss of tackiness was recorded. This length of time was 11.6 sec., 14.3 sec., and 10.4 sec., respectively, for resins E, F, and G. Each of the resins was tested at a viscosity of 212 centipoises, so that their degrees of advancement or molecular size would be about equal. In the case of resins F and G, this required several days aging at room temperature, since their initial viscosities were less than 212 centipoises.

The hot plate test results show that at the same total aldehyde/phenol molar ratio, a phenol-furfural-formaldehyde resin is slower curing than a straight phenol-formaldehyde resin, but if the formaldehyde/phenol molar ratio of the phenol-furfural-formaldehyde resin is held the same as that of the straight phenol-formaldehyde resin, this retardation of cure is prevented.

*Example IV*

Resin C was used in the preparation of resin H, which is an intercondensation product of resin C and formaldehyde. Resin C was mixed with formaldehyde and sodium hydroxide in the following proportions:

27.95 parts by weight resin C
38.56 parts by weight 37.18% uninhibited formaldehyde
18.78 parts by weight water
1.93 parts by weight 49.00% NaOH (first increment)
8.15 parts by weight 49.00% NaOH (second increment)
4.63 parts by weight 49.00% NaOH (third increment)
_____
100.00 parts by weight total Resin C was placed in the reaction kettle and agitation was started. The first increment of NaOH was added, its purpose being to prevent precipitation of resin C when the formaldehyde and water were added. The formaldehyde and water were then blended in and the second increment of NaOH was added slowly over a period of 15 minutes. The addition of the second increment of NaOH slowly over a period of time promoted and provided a gradual temperature rise since the dilution of the NaOH and the exothermic reaction initiated by the NaOH produces a very considerable heating effect. From the start of the addition of the second increment of NaOH, the temperature was controlled to rise uniformly to refluxing temperature, that is between 100–103° C., in about 50 minutes by passing cold water and steam through the kettle jacket at predetermined time intervals. At the start of the cook, small samples of the mixture showed cloudiness upon dilution due to the water insolubility of resin C, but by the time the temperature had increased to about 60° C., small samples of the mixture were miscible with water in all proportions.

After the reaction mixture was made and heated to boiling as above set forth, the resulting reaction product was refluxed for about 8 minutes, after which the viscosity measured at 25° C. was about 80 centipoises. The temperature was then lowered to about 80° C. during a period of 35 minutes. The third increment of NaOH was then added and the temperature of the charge was maintained at 80–85° C. for 112 minutes. During this period the viscosity measured at 25° C. increased from less than 125 centipoises to about 235 centipoises. Cooling was then applied to reduce the temperature to about 20° C. The finished resin was a brown liquid with a viscosity of 262 centipoises at 25° C.; a specific gravity of 1.198; and a total solids content of 40.9% determined by heating a one-gram sample at 125° C. for 1¾ hours. This resin has a formaldehyde to phenol molar ratio of 2.5; a furfural to phenol molar ratio of 0.35; a total aldehyde to phenol molar ratio of 2.85; and a sodium hydroxide to phenol molar ratio of 0.98. The calculated percentage of NaOH is 7.57%.

A plywood adhesive was prepared from resin H in the same manner that adhesive I in Example I was prepared from resin B. The finished mix was a dark brown, thin, homogeneous liquid having a viscosity of 12 on a McMichael viscosimeter measured at 25° C. with a No. 30 wire using 20 R. P. M. rotation and 5 cm. spindle immersion. Four 3-ply ⅞₆" Douglas fir plywood panels were made with this adhesive using about 60 lbs. spread per 1000 sq. ft. of plywood, 285° F. platen temperature, 175 lbs./sq. in. pressure, 3½ minute pressing time, and 3 to 15 minutes assembly time. When these panels were tested according to the Douglas Fir Plywood Association Commercial Standard CS 45–48 Boiling Test, they produced an average wood failure result of 98%.

In producing the initial condensation product defined as resin A by condensing phenol, cresol, or xylenol with furfural many, if not all, of the bases of the alkali metals and the alkaline salts of the alkali metals may be used as the catayst during the preparation of resin A. Some of the bases of the alkali metals and alkali earth metals and the alkaline salts of said metals that may be used in this initial reaction period are the carbonates and oxides of sodium, lithium, potassium, calcium, barium, and magnesium. The catalyst used in producing resin A may be an organic compound as, for example, a highly concentrated organic amine, such as ethanol amine. However, after the formaldehyde has been added to the monohydric phenol-furfural condensation product, the alkaline additions are best made with sodium hydroxide. The function of the sodium hydroxide or caustic used in the preparation of resin B is to raise the pH of the alkaline solution of the phenol-furfural-formaldehyde intercondensed product and thereby increase the solubility of the sodium salt of the phenol-aldehyde condensation product in its aqueous alkaline carrying medium. In general, the pH of the final intercondensed product should be between the limits of about 8.5, 9, or 9.5, and 14.

In producing resin B part of the alkali metal hydroxide, such as sodium hydroxide, lithium hydroxide, or potassium hydroxide, may be replaced by an alkali carbonate as, for example, sodium carbonate. For example, 25 to 50% of the sodium hydroxide may be replaced by sodium carbonate. It has been discovered that when the alkali carbonate is used in conjunction with the alkali metal hydroxide in the preparation of resin B, that the rate of reaction is increased and, therefore, the cooking time is shortened.

While the preparation of the phenol-furfural resin herein defined as resin A has been given in detail and it represents one form of the invention which has given very satisfactory results, it is within the province of the present invention to use any of the prior art monohydric phenol-furfural resins and place them in solution in phenol and then intercondense with formaldehyde in the manner herein set forth and within the molar ratios set forth, including both the phenol-furfural ratio, the formaldehyde-phenol ratio, and the amounts of alkaline material present during the preparation of resin A and during the preparation of the intercondensed resin B, the total alkali present during the preparation of both resin A and resin B being as herein set forth.

It is thought the present method and the product distinguish from the prior art by the use of high aldehyde to phenol molar ratio to offset retardation of cure and, second, by the molar ratios of the reacting ingredients and specifically, the proportions of the alkaline catalyst used in the preparation of resin A and resin B, and the total amount of alkaline material used, expressed as sodium hydroxide. It is believed that the high proportions of sodium hydroxide used together with the condensation process employed, produces a high molecular weight resin.

It is desired to point out that the intercondensed resin of the present invention is essentially a plywood monohydric phenol-furfural-formaldehyde resin. However, the total aldehyde-phenol molar ratios are higher than those present in most monohydric phenol-aldehyde resin condensation products, and certainly higher than those products which are produced by intercondensing a phenol-furfural resin with formaldehyde. As the total aldehyde-phenol molar ratio approaches 3, there is a tendency to incomplete formaldehyde condensation or a loss of formaldehyde due to Cannizzaro's reaction, and further, the resulting product has a short storage life. However, when producing the present resin, it has been possible to use aldehyde-phenol ratios approaching 3. In producing some of the resins, 1.85 mols of formaldehyde per mol of monohydric phenol have been used, and the total aldehyde which includes the furfural and the formaldehyde, has been 2.1 mols per mol of phenol. Excellent results have been obtained when the formaldehyde to phenol ratio has been 2.5 mols, and the total aldehyde-phenol ratio has been 2.75 mols of aldehyde per mol of phenol. The term "total aldehyde" includes furfural or its equivalent, and formaldehyde and its equivalent, and, of course, instead of using formaldehyde, paraformaldehyde may be used.

In utilizing the intercondensed resin herein disclosed in the production of plywood or in the production of fiber products, such as hardboards, softboards, wallboards, and the like, the resin may be mixed with various fillers both reactive and non-reactive, such as walnut shell flour, wood flour, fir bark, lignin, and the like, to improve the product, said fillers resulting in a better dispersion of the resin with the consequent reduction of shrinkage of the product and low water absorption.

When forming a cellulose product bonded of the herein set forth insoluble infusible monohydric phenol-furfural-formaldehyde resin, the product such as plywood or hardboard or any of the products herein set forth, may be heated under pressure at a temperature between the limits of about 200° F. and about 330° F.

The monohydric phenol may be defined as having a distillation range between about 175° C. and about 225° C.

"Furafil M," mentioned in Example I, is the residue from the production of furfural from corn cobs. The corn cobs are ground and heated under pressure with acid, which hydrolyzes the pentosans to furfural. The lignocellulose residue is dried and ground further. This is the product that is marketed under the trade name "Furafil" by the Quaker Oats Company.

Resin A is respresentive of the condensation product of monohydric phenol such as phenol per se, and furfural, said condensation product being in solution in an excess of phenol, as for example, phenol per se, the latter being adapted to be reacted with an aldehyde, such as formaldehyde, to form an intercondensation product. The limitations set forth in connection with resin A are applicable to all of the initial resin condensation products, including resin C.

Resin B is representative of the intercondensed resin and the limitations set forth in connection with the preparation of said resin B are applicable to the other intercondensed resin products set forth, including resins D and G.

It is desired to point out that the most satisfactory results are obtained using phenol per se, $C_6H_5OH$. While meta-para-cresol and 3,5-xylenol may be used in carrying out the present invention, the bonds obtained when bonding plywood are less satisfactory.

Instead of using formaldehyde, any formaldehyde generating material may be used.

It is desired to point out that the final resin produced is one having a high molecular weight, said resin being one that has been advanced toward the C stage where the resin assumes an insoluble, infusible state. However, the tendency of the intercondensed resin to progress toward a water insoluble stage is progressively reduced by the addition of increments of alkaline material, such as sodium hydroxide which permits further condensation and further advancement of the resin reaction-product toward, but never attaining, the insoluble, infusible state. For example, resin D is produced by the addition of two increments of sodium hydroxide.

What is claimed is:

1. The method comprising producing a thermosetting phenol-furfural-formaldehyde resin condensation product in which retardation in the rate of cure of the resin condensation product is substantially inhibited, by forming an aqueous mixture of a monohydric phenol selected from the group of phenols consisting of phenol per se, cresol and xylenol; furfural, and an alkaline catalyst accelerating the formation of the resin-reaction product on heating, there being present between about 0.1 and about 0.5 mol of furfural for each mol of phenol, heat-reacting said mixture and producing a solution of the monohydric phenol-furfural resin in an excess of monohydric phenol, the latter being adapted to combine with subsequently added formaldehyde, and heat-reacting and intercondensing said solution with formaldehyde in the presence of an inorganic alkali metal compound until the final intercondensed resin solution having a solids content between about 30% and about 55% has a viscosity between the limits of about 130 and about 10,000 centipoises, there being present between about 1.5 and about 2.9 mols of formaldehyde for each mol of phenol, the total alkaline material present during the production of the monohydric phenol-furfural-formaldehyde intercondensed resin being equivalent to between about 0.1 and about 1.0 mol of sodium hydroxide per mol of phenol.

2. The method comprising producing a thermosetting phenol-furfural-formaldehyde resin condensation product in which retardation in the rate of cure of the resin condensation product is substantially inhibited, by forming an aqueous mixture of a monohydric phenol selected from the group of phenols consisting of phenol per se, cresol and xylenol; furfural, and an alkaline catalyst accelerating the formation of the resin-reaction product on heating, there being present between about 0.1 and about 0.5 mol of furfural for each mol of phenol, heat-reacting said mixture and producing a solution of the monohydric phenol-furfural resin in an excess of monohydric phenol, the latter being adapted to combine with subsequently added formaldehyde, and heat-reacting and intercondensing said solution with formaldehyde in the presence of an inorganic alkali metal compound until the final intercondensed resin solution having a solids content between about 30% and about 55% has a viscosity between the limits of about 130 and about 10,000 centipoises, there being present between about 1.8 and about 2.5 mols of formaldehyde for each mol of phenol, the total alkaline material present during the production of the monohydric phenol-furfural-formaldehyde intercondensed resin being equivalent to between about 0.1 and about 1.0 mol of sodium hydroxide per mol of phenol.

3. The method comprising producing a thermosetting phenol-furfural-formaldehyde resin condensation product in which retardation in the rate of cure of the resin condensation product is substantially inhibited, by forming an aqueous mixture of a monohydric phenol selected from the group of phenols consisting of phenol per se, cresol and xylenol; furfural, and an alkaline catalyst accelerating the formation of the resin-reaction product on heating, said catalyst being present in an amount equivalent to between about 0.01 and about 0.15 mol per mol of monohydric phenol, there being present between about 0.1 and about 0.5 mol of furfural for each mol of phenol, heat-reacting said mixture and producing a solution of the monohydric phenol-furfural resin in an excess of monohydric phenol, the latter being adapted to combine with subsequently added formaldehyde, and heat-reacting and intercondensing said solution with formaldehyde in the presence of an inorganic alkali metal compound until the final intercondensed resin solution having a solids content between about 30% and about 55% has a viscosity between the limits of about 130 and about 10,000 centipoises, there being present between about 1.5 and about 2.9 mols of formaldehyde for each mol of phenol, the total alkaline material present during the production of the monohydric phenol-furfural-formaldehyde intercondensed resin being equivalent to between about 0.1 and about 1.0 mol of sodium hydroxide per mol of phenol.

4. The method comprising producing a thermosetting phenol-furfural-formaldehyde resin condensation product in which retardation in the rate of cure of the resin condensation product is substantially inhibited, by forming an aqueous alkaline solution of a heat-reaction product of phenol and furfural in an excess of phenol, the latter being adapted to combine with subsequently added formaldehyde, said phenol being selected from the group of phenols consisting of phenol per se, cresol and xylenol, and heat-reacting and intercondensing said alkaline solution in the presence of an inorganic alkali metal compound which is added in increments with a condensation step between each addition of said alkali metal compound until the final highly intercondensed resin solution which is advanced toward its insoluble and infusible state but never attains the same has a solids content between about 30% and about 55% and a viscosity between the limits of about 130 and about 10,000 centipoises, there being present between about 1.5 and about 2.9 mols of formaldehyde for each mol of phenol, said intercondensed resin solution having a pH between about 8 and about 14.9.

5. The method comprising producing a thermosetting phenol-furfural-formaldehyde resin condensation product in which retardation in the rate of cure of the resin condensation product is substantially inhibited, by forming an aqueous mixture of a monohydric phenol selected from the group of phenols consisting of phenol per se, cresol and xylenol; furfural, and an alkaline catalyst accelerating the formation of the resin-reaction product on heating, there being present between about 0.1 and about 0.5 mol of furfural for each mol of phenol, heat-reacting said mixture and producing a solution of the monhydric phenol-furfural resin in an excess of monohydric phenol, the latter being adapted to combine with subsequently added formaldehyde, and heat-reacting and intercondensing said solution with formaldehyde in the presence of an inorganic alkali metal compound which is added in increments with a condensation step between each addition of said alkali metal compound until the final highly intercondensed resin solution which is advanced toward its insoluble and infusible state but never attains the same has a solids content between about 30% and about 55% and a viscosity between the limits of about 130 and about 10,000 centipoises, there being present between about 1.5 and about 2.9 mols of formaldehyde for each mol of phenol, the total alkaline material present during the production of the monohydric phenol-furfural-formaldehyde intercondensed resin being equivalent to between about 0.1 and about 1.0 mol of sodium hydroxide per mol of phenol.

6. The method comprising producing a thermosetting phenol-furfural-formaldehyde resin condensation product in which retardation in the rate of cure of the resin condensation product is substantially inhibited, by forming an aqueous mixture of a monohydric phenol selected from the group of phenols consisting of phenol per se, cresol and xylenol; furfural, and an alkaline catalyst accelerating the formation of the resin-reaction product on heating, said catalyst being present in an amount equivalent to between about 0.01 and about 0.15 mol per mol of monohydric phenol, there being present between about 0.1 and about 0.5 mol of furfural for each mol of phenol, heat-reacting said mixture and producing a solution of the monohydric phenol-furfural resin in an excess of monohydric phenol, the latter being adapted to combine with subsequently added formaldehyde, and heat-reacting and intercondensing said solution with formaldehyde in the presence of an inorganic alkali metal compound which is added in increments with a condensation step between each addition of said alkali metal compound until the final highly intercondensed resin solution which is advanced toward its insoluble and infusible state but never attains the same has a solids content between about 30% and about 55% and a viscosity between the limits of about 130 and about 10,000 centipoises, there being present between about 1.5 and about 2.9 mols of formaldehyde for each mol of phenol, the total alkaline material present during the production of the monohydric phenol-furfural-formaldehyde intercondensed resin being equivalent to between about 0.1 and about 1.0 mol of sodium hydroxide per mol of phenol.

7. The product of the method of claim 6.

8. The method of forming a cellulose product bonded with an insoluble infusible phenol-furfural-formaldehyde resin condensation product comprising forming a composite unit comprising cellulose components and a solution of a thermosetting resin-reaction product formed by heat-reacting an aqueous mixture of a monohydric phenol selected from the group of phenols consisting of phenol per se, cresol and xylenol; furfural, and an alkaline catalyst accelerating the formation of the resin-reaction product on heating, said catalyst being present in an amount equivalent to between about 0.01 and about 0.15 mol per mol of monohydric phenol, there being present between about 0.1 and about 0.5 mol of furfural for each mol of phenol, heat-reacting said mixture and producing a solution of the monohydric phenol-furfural resin in an excess of monohydric phenol, the latter being adapted to combine with subsequently added formaldehyde, heat-reacting and intercondensing said solution with formaldehyde in the presence of an inorganic alkali metal compound until the final intercondensed resin solution having a solids content between about 30% and about 55% has a viscosity between the limits of about 130 and about 10,000 centipoises, there being present between about 1.5 and about 2.9 mols of formaldehyde for each mol of phenol, the total alkaline material present during the production of the monohydric phenol-furfural-formaldehyde intercondensed resin being equivalent to between about 0.1 and about 1.0 mol of sodium hydroxide per mol of phenol, said intercondensed resin-reaction product being retained by the cellulose components, and hot-pressing the resulting mass of cellulose components until the resin bonding agent is converted into its insoluble infusible state.

9. The method defined in claim 1 in which the final intercondensed resin solution has a viscosity between about 130 and 500 centipoises.

10. The method defined in claim 2 in which the final intercondensed resin solution has a viscosity between about 130 and 3600 centipoises.

11. The method defined in claim 1 wherein the monohydric phenol is phenol per se $C_6H_5OH$.

12. The product of the method of claim 11.

13. Hot pressed plywood glued by the phenol-furfural-formaldehyde resin of claim 6.

14. The method defined in claim 1 in which the monohydric phenol is phenol per se $C_6H_5OH$ and the viscosity of the final intercondensed resin solution is between the limits of about 130 and 3600 centipoises.

15. The product of the method of claim 14.

16. The method comprising preventing retardation in the rate of cure of a phenol-furfural-formaldehyde resin condensation product and conferring thereon the same rate of cure as that possessed by a straight phenol-formaldehyde resin condensation product produced under substantially identical conditions, the formaldehyde-phenol molar ratio being the same for both resins; by forming a monohydric phenol-furfural-formaldehyde resin condensation product, the total aldehyde-phenol molar ratio of the phenol-furfural-formaldehyde resin condensation product being greater than that of said phenol-formaldehyde resin condensation product, said phenol-furfural-formaldehyde resin condensation product being produced by forming an aqueous mixture of a monohydric phenol selected from the group of phenols consisting of phenol per se, cresol and xylenol; furfural, and an inorganic alkaline catalyst accelerating the formation of the resin-reaction product on heating, there being present between about 0.1 and about 0.5 mol of furfural for each mol of phenol, heat-reacting said mixture and producing a solution of a monohydric phenol-furfural resin in an excess of monohydric phenol, the latter being adapted to combine with subsequently added formaldehyde, and heat-reacting and intercondensing said solution with formaldehyde in the presence of a mixture of sodium hydroxide and sodium carbonate, said mixture accelerating the rate of the intercondensing reaction and shortening the time of intercondensation, said heat-reacting and intercondensing being continued until the final intercondensed resin solution having a solids content between about 30% and about 55% has a viscosity between the limits of about 130 and 10,000 centipoises, there being present between 1.5 and 2.9 mols of formaldehyde for each mol of phenol, the total alkaline material present during the production of the phenol-furfural-formaldehyde intercondensed resin being equivalent to between about 0.1 and 1.0 mol of sodium hydroxide per mol of phenol.

17. The method defined in claim 8 in which the monohydric phenol is phenol per se.

18. The method defined in claim 1 in which the phenol is preheated prior to mixture thereof with furfural to thereby prevent undesirable side reactions.

References Cited in the file of this patent

UNITED STATES PATENTS

| | | |
|---|---|---|
| 1,737,121 | Novotny | Nov. 26, 1929 |
| 1,857,357 | Cherry et al. | May 10, 1932 |
| 2,457,493 | Redfern | Dec. 28, 1948 |
| 2,566,851 | Novotny et al. | Sept. 4, 1951 |
| 2,745,816 | Dijkstra | May 15, 1956 |

FOREIGN PATENTS

| | | |
|---|---|---|
| 1,054,258 | France | Oct. 7, 1953 |